(12) United States Patent
Klarer et al.

(10) Patent No.: US 7,117,390 B1
(45) Date of Patent: Oct. 3, 2006

(54) PRACTICAL, REDUNDANT, FAILURE-TOLERANT, SELF-RECONFIGURING EMBEDDED SYSTEM ARCHITECTURE

(75) Inventors: Paul R. Klarer, Albuquerque, NM (US); David R. Hayward, Albuquerque, NM (US); Wendy A. Amai, Albuquerque, NM (US)

(73) Assignee: Sandia Corporation

( * ) Notice: Subject to any disclaimer, the term of this patent is extended or adjusted under 35 U.S.C. 154(b) by 584 days.

(21) Appl. No.: 10/441,598

(22) Filed: May 19, 2003

Related U.S. Application Data

(60) Provisional application No. 60/382,102, filed on May 20, 2002.

(51) Int. Cl.
*G06F 11/00* (2006.01)
(52) U.S. Cl. .................................................. 714/13
(58) Field of Classification Search ............ 714/10, 714/13
See application file for complete search history.

(56) References Cited

U.S. PATENT DOCUMENTS

| | | | | |
|---|---|---|---|---|
| 4,350,225 A * | 9/1982 | Sakata et al. | ............... | 187/248 |
| 4,511,982 A * | 4/1985 | Kurakake | ................... | 700/177 |
| 4,532,594 A * | 7/1985 | Hosaka et al. | .............. | 701/114 |
| 4,654,846 A * | 3/1987 | Goodwin et al. | ............. | 714/13 |
| 4,775,957 A * | 10/1988 | Yakuwa et al. | ............... | 714/10 |
| 4,881,227 A * | 11/1989 | Buhren | ........................ | 714/11 |
| 5,047,944 A * | 9/1991 | Ishikawa et al. | ............ | 701/114 |
| 5,251,299 A * | 10/1993 | Masuda et al. | ............... | 714/10 |
| 5,526,267 A * | 6/1996 | Sogawa | ....................... | 701/114 |
| 5,530,946 A * | 6/1996 | Bouvier et al. | ............... | 714/23 |
| 5,638,507 A * | 6/1997 | Akai et al. | .................... | 714/13 |
| 5,699,504 A * | 12/1997 | Mano | .......................... | 714/13 |
| 5,764,882 A * | 6/1998 | Shingo | ........................ | 714/11 |
| 5,774,642 A * | 6/1998 | Flon et al. | .................... | 714/13 |
| 5,796,937 A * | 8/1998 | Kizuka | ........................ | 714/13 |
| 5,916,296 A * | 6/1999 | Honda | ........................ | 701/115 |
| 5,978,932 A * | 11/1999 | Nishiyuki et al. | ............ | 714/11 |
| 6,178,445 B1 * | 1/2001 | Dawkins et al. | ............ | 709/209 |
| 6,189,112 B1 * | 2/2001 | Slegel et al. | .................. | 714/10 |
| 6,230,282 B1 * | 5/2001 | Zhang | ............................ | 714/6 |
| 6,351,823 B1 * | 2/2002 | Mayer et al. | ................. | 714/10 |
| 6,622,265 B1 * | 9/2003 | Gavin | ......................... | 714/38 |
| 6,625,751 B1 * | 9/2003 | Starovic et al. | .............. | 714/11 |
| 6,715,099 B1 * | 3/2004 | Smith | ........................... | 714/4 |

(Continued)

FOREIGN PATENT DOCUMENTS

EP           82306832.5       12/1982

*Primary Examiner*—Robert Beausoliel
*Assistant Examiner*—Amine Riad
(74) *Attorney, Agent, or Firm*—William R. Conley; Fred A. Lewis

(57) ABSTRACT

This invention relates to system architectures, specifically failure-tolerant and self-reconfiguring embedded system architectures. The invention provides both a method and architecture for redundancy. There can be redundancy in both software and hardware for multiple levels of redundancy. The invention provides a self-reconfiguring architecture for activating redundant modules whenever other modules fail. The architecture comprises: a communication backbone connected to two or more processors and software modules running on each of the processors. Each software module runs on one processor and resides on one or more of the other processors to be available as a backup module in the event of failure. Each module and backup module reports its status over the communication backbone. If a primary module does not report, its backup module takes over its function. If the primary module becomes available again, the backup module returns to its backup status.

19 Claims, 5 Drawing Sheets

U.S. PATENT DOCUMENTS

| | | | |
|---|---|---|---|
| 6,769,073 B1 * | 7/2004 | Shapiro | 714/11 |
| 6,785,841 B1 * | 8/2004 | Akrout et al. | 714/11 |
| 6,874,103 B1 * | 3/2005 | Cepulis | 714/13 |
| 6,928,584 B1 * | 8/2005 | Labana | 714/13 |
| 6,961,826 B1 * | 11/2005 | Garnett et al. | 711/144 |
| 6,990,320 B1 * | 1/2006 | LeCren | 455/67.11 |

* cited by examiner

PRACTICAL, REDUNDANT, FAILURE-TOLERANT, SELF-RECONFIGURING EMBEDDED SYSTEM ARCHITECTURE

RELATED APPLICATIONS

This application claims priority under 35 U.S.C. §119(e) of U.S. Provisional Application 60/382,102 filed on May 20, 2002, the entire content of which is herein incorporated by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

This invention relates to the field of system architectures, specifically failure-tolerant and self-reconfiguring embedded system architectures.

In considering a conceptual design for an Unmanned Ground Combat Vehicle (UGCV) prototype, one important design criterion is survivability. This is interpreted in at least one context to mean an ability of the vehicle system to sustain damage to, or failure of, portions of the onboard vehicle hardware and software control systems, while still maintaining some level of operational capability, even at a degraded level. As a result of this design criterion, a system concept has been developed that provides a capability to detect damage to or failure of portions of the system, and through inherent redundancy and self-monitoring, the system can reconfigure itself to recover functionality initially lost as a result of the damage. The system described herein is primarily a software implementation, although it relies on certain hardware configuration assumptions without which it will not function as described.

This system could be used in any distributed computing system that requires multiple levels of redundancy and is exposed to hazardous conditions or vulnerable to severe physical damage. Examples include battlefield systems, mining equipment, spacecraft, heavy industrial equipment, explosive atmospheres, tornado/hurricane monitoring equipment, and similar applications for military, government, or industrial users.

SUMMARY OF THE INVENTION

The invention provides configuration control for multiple processors. One embodiment is for a distributed computing system that requires multiple levels of redundancy and is vulnerable to damage or loss of function often from operation in a hazardous environment. Another embodiment is for an automated vehicle for surveillance, requiring survivability. The hardware platform can be distributed or not distributed.

The invention provides a self-reconfiguring architecture for activating redundant modules whenever other modules fail. The architecture can comprise: a communication backbone with two or more processors connected to the communication backbone and with software modules running on each of the processors. Each software module can run on one processor and reside on one or more of the other processors to be available as a backup module in the event of failure. Each module and backup module can report its status over the communication backbone. If a primary module does not report, its backup module can take over its function. If the primary module becomes available again, the backup module can return to its backup status.

The invention provides for multiple processors, primary and backup modules, and primary and backup sensors. Communication can be to the communication backbone in blackboard form, available to multiple processors.

The invention provides both a method and an architecture or strategy for redundancy. There can be redundancy in both software and in hardware (processors and sensors) for multiple levels of redundancy. An example is a robot system with several computers and several modules. Each module can run a portion of the overall system and work in synergy. At the same time, each module can exist as a primary module and as a backup module, providing redundancy if the primary module fails.

The invention supports failure-tolerant hardware configuration, has simple implementation requirements, allows for heterogeneous hardware platforms, and has high robustness/redundancy with fast runtime execution (minimal runtime overhead penalty). It is good to identify high risk/single point of failure hardware items.

BRIEF DESCRIPTION OF THE DRAWINGS

The accompanying drawings, which are incorporated into and form part of the specification, illustrate embodiments of the invention and, together with the description, serve to explain the principles of the invention.

DETAILED DESCRIPTION

Configuration of a Basic System

Figure 1:
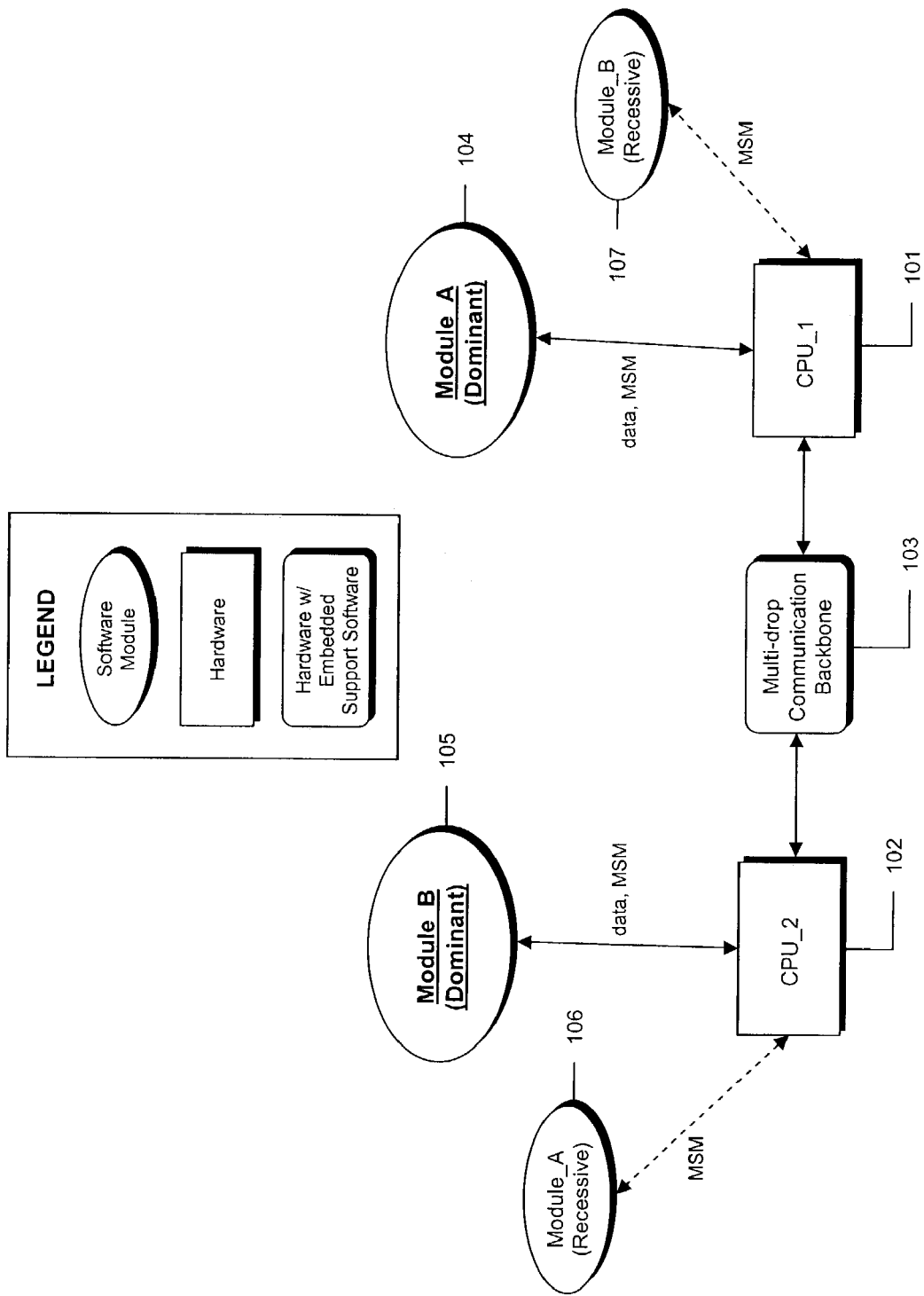
FIG. 1 is a diagram of a simple system configuration.

The system assumes a hardware architecture that supports distributed computing via a set of processors connected to a multi-drop communication backbone (i.e. Ethernet or RS485). Although a homogeneous set of processors is assumed, homogeneity is not a requirement and a heterogeneous set of processors can be accommodated. FIG. 1 illustrates a simple system configuration with all of the essential elements. The system consists of two processors, 101 and 102, connected to a communication backbone 103 and two software modules, 104 and 105. A copy of each software module, 106 and 107, resides on each processor, but one copy of each is designated as either 'Dominant' or 'Recessive' depending on which processor it resides on.

Operation of Software Module Redundancy

All modules monitor the communication backbone data traffic, looking for a circulating message containing a representation of the current functional state of all modules in the system, called the Module Status Message (MSM). The possible functional states for modules are 'active' or 'inactive'. By default, 'Dominant' modules are 'active' and 'Recessive' modules are 'inactive'. An 'active' module is receiving, processing, and outputting data as required for its intended functionality. It is also periodically updating the MSM with its functional condition, typically only noting that it is running. An 'inactive' module is not processing or outputting data, it is only monitoring the MSM and also periodically updating the MSM by noting its own functional condition. The implementation of such a system is well known to those of ordinary skill in the art.

When a failure occurs in either hardware or software, the MSM will reflect the functional loss of a module since that module is no longer updating the MSM appropriately. Using a watchdog monitoring scheme, the 'Recessive' (inactive) module can detect the loss of its associated 'Dominant' (active) module and will then activate itself to take over that functionality. If for some reason the lost 'Dominant' module becomes active again, the 'Recessive' module can detect that event in the MSM and will demote itself back to the inactive state. This inherent capability makes the system self-correcting for losses of either hardware or associated software functionality, and can revert to a previous configuration if the loss condition proves to be temporary. Implementation of the MSM itself can be as comprehensive as desired using a data blackboard structure shared (received, updated, and retransmitted) by all modules, or could be as simple as a bit-field containing single bit positions. Each bit corresponds to each software module in the system where a functional 'active' module simply toggles its bit at an appropriate update rate and 'inactive' modules monitor the toggle rate of appropriate bits to determine if the associated 'Dominant' module is running.

Module Implementation on CPUs

Each CPU can implement the control of its individual modules in a centralized or distributed fashion. In a centralized scheme, a main controller reviews the MSM and activates or deactivates modules on the CPU. In a distributed scheme, each module on a CPU independently reviews the MSM to determine whether it should become active or inactive. As such, a module is never really inactive, as some part of the module is still running in order to determine whether the module should become active. The activity state of a module is important for determining resource usage on a particular CPU. It is also important for deciding how context information is obtained by a 'Recessive' module when a switch occurs from the 'Dominant' module. Assuming each 'Recessive' module is running at some low level will allow each 'Recessive' module to maintain an up-to-date context so that it can be switched to with minimum of latency.

Multiple Levels of Redundancy

Figure 2:
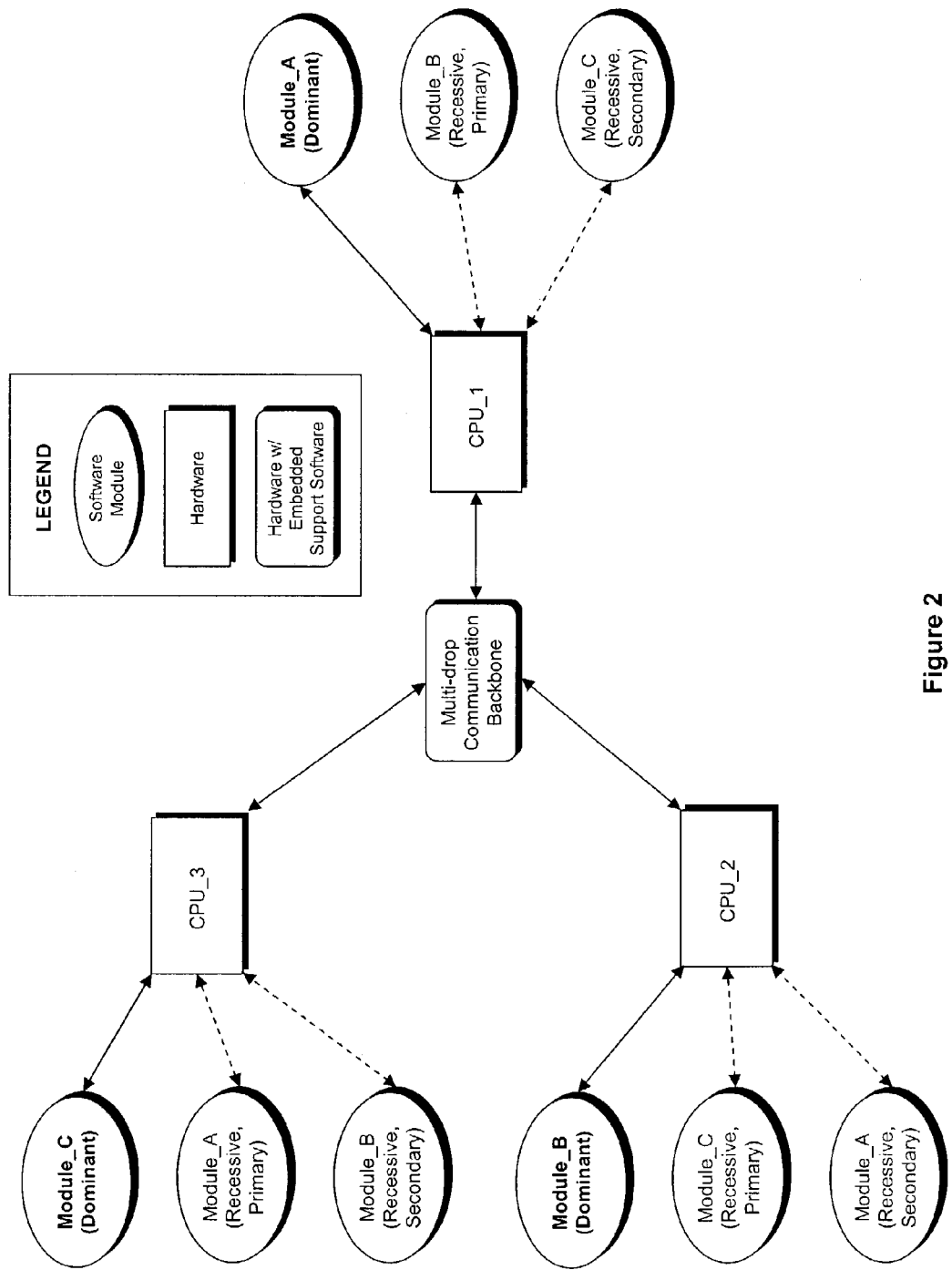
FIG. 2 is a diagram of a system configuration with multiple levels of redundancy.

More complex configurations are supported by this architecture, as illustrated in FIG. 2. Multiple levels of redundancy are possible to virtually any level, limited only by processing capacity of individual processors and bandwidth limitations of the communication backbone. 'Primary Recessive' modules would operate as described above. 'Secondary Recessive' modules would monitor both the 'Dominant' and 'Primary Recessive' modules and become active if both of those modules are determined to be non-functional.

Hardware-Associated Redundancy Issues

Figure 3:
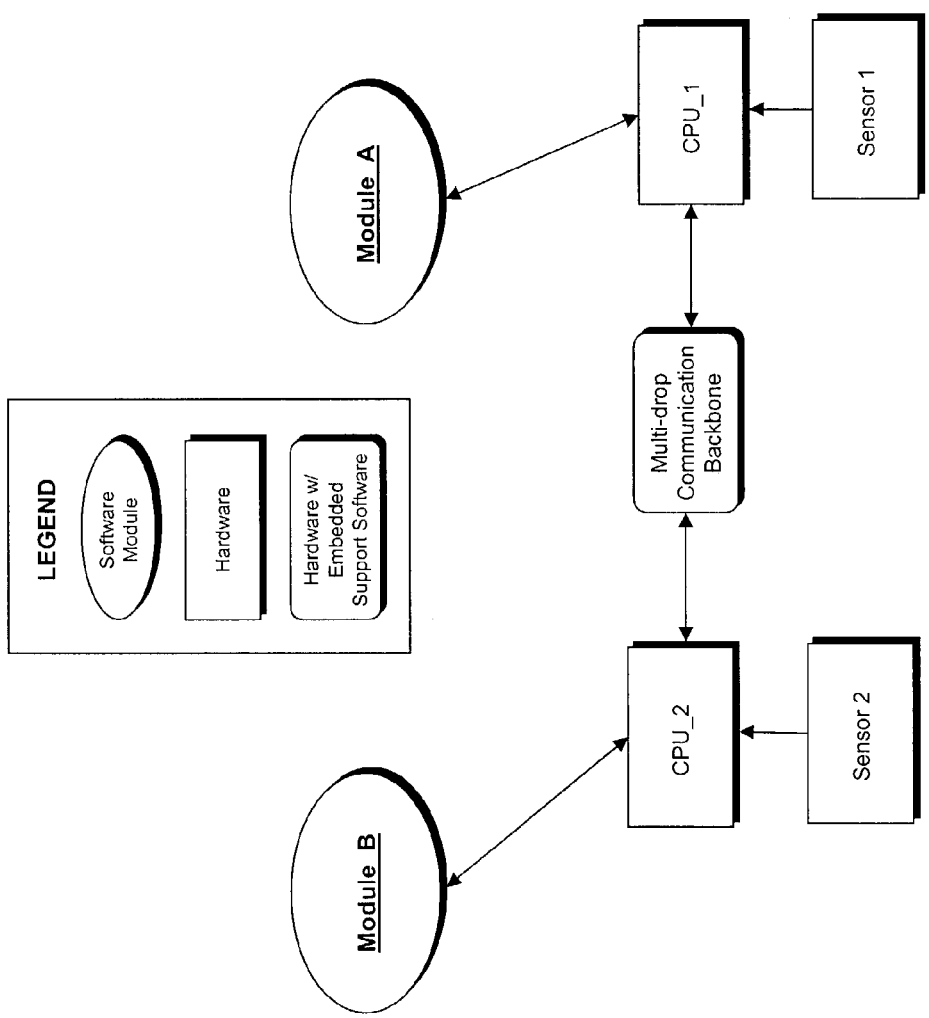
FIG. 3 is a diagram of a simple system with sensing hardware.

For many embedded systems, there are particular hardware requirements associated with software modules that must also accommodate failure modes and provide redundancy. FIG. 3 illustrates such as system without any redundancy, implemented as a distributed computing system over a communication backbone. Note that failure of any single processor, software module, or sensor will result in the total loss of that particular functionality.

Figure 4:
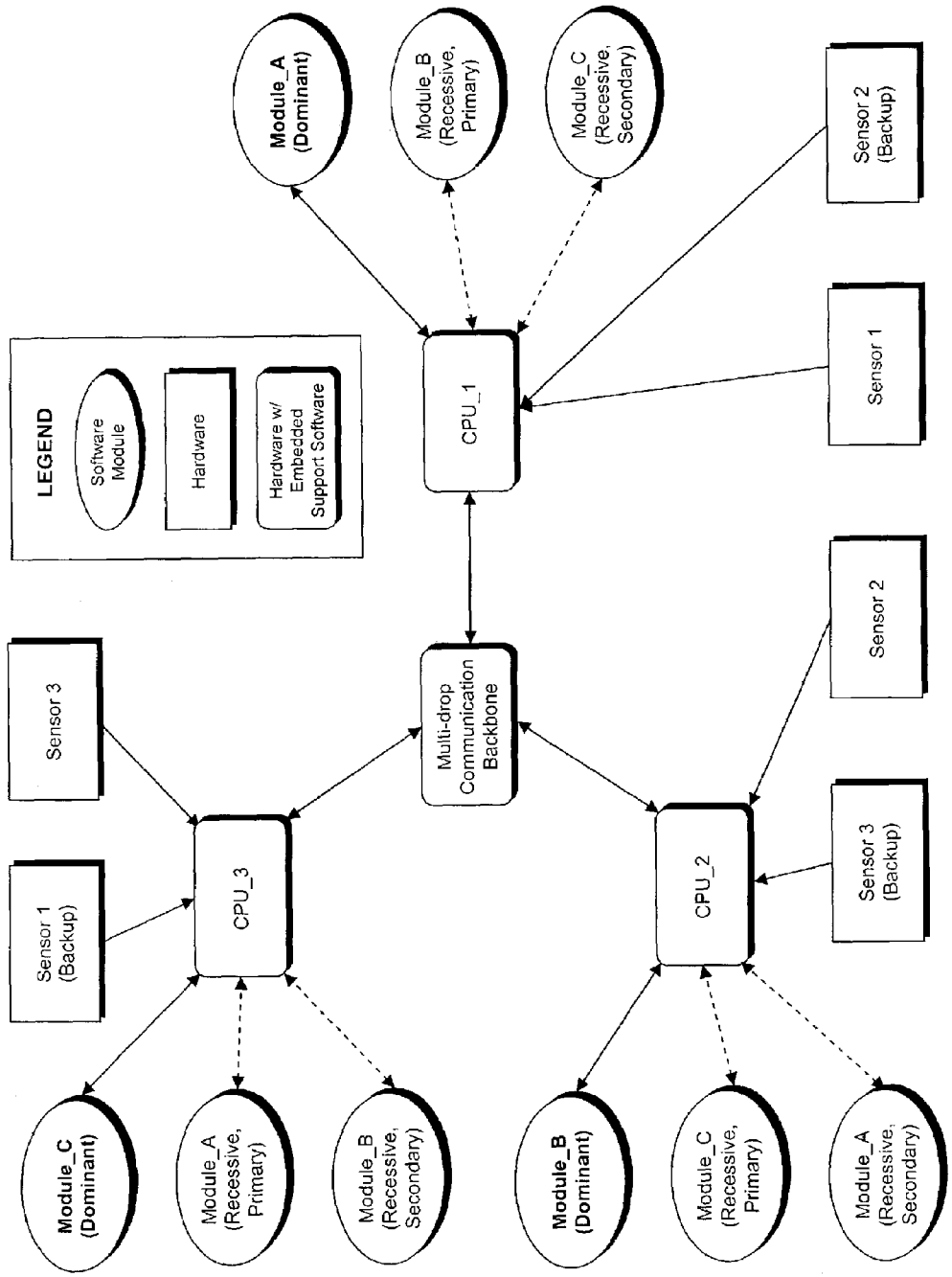
FIG. 4 is a diagram of a system with redundant processing, sensing, and software.
Figure 5:
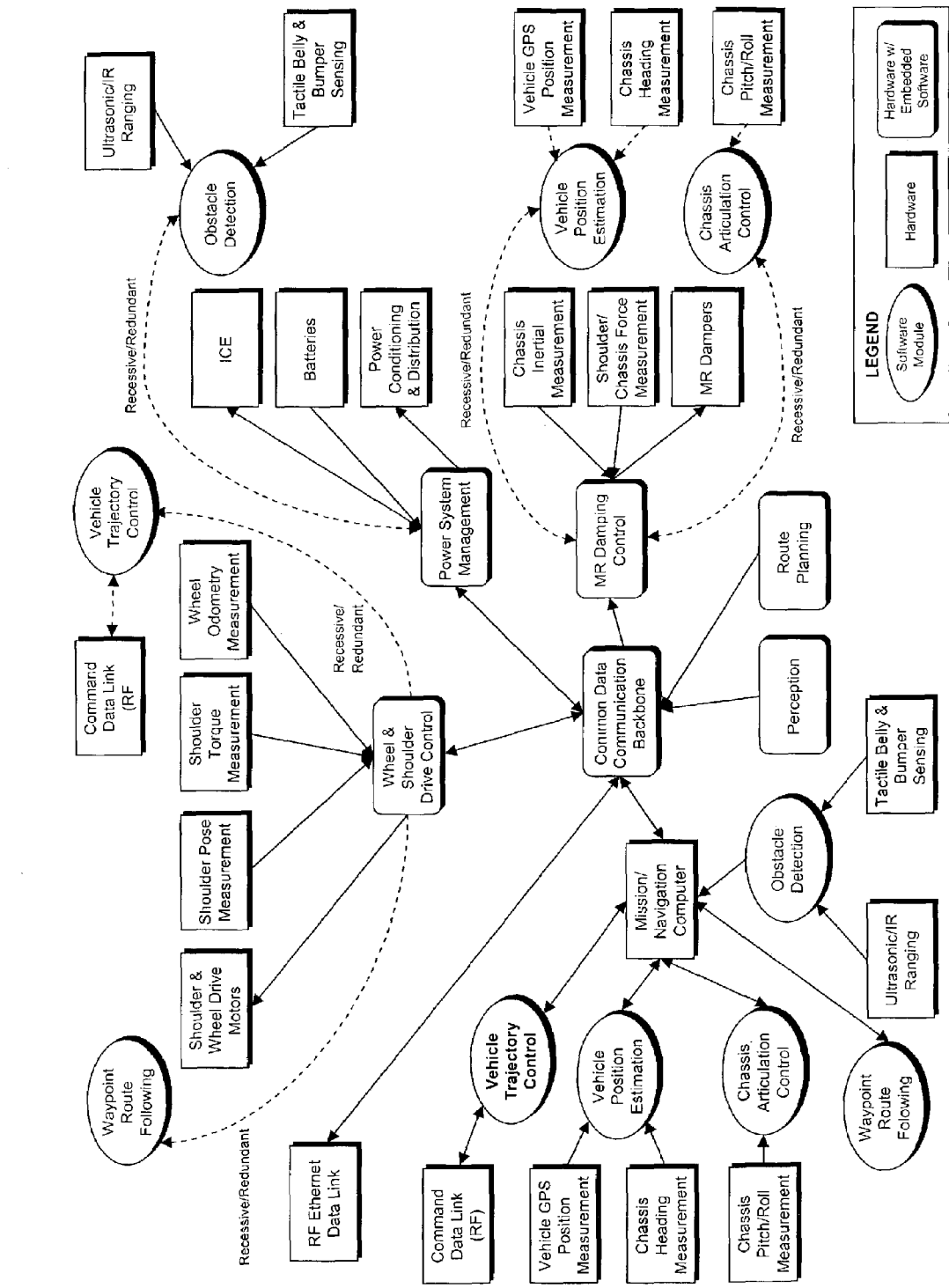
FIG. 5 is a diagram of a system for an Unmanned Ground Combat Vehicle (UGCV) pursuant to the present invention.

Making the system in FIG. 3 redundant and failure tolerant as described earlier requires redundant sensor hardware and a method for accommodating both hardware and software failures. FIG. 4 illustrates the modifications required to accomplish system redundancy by adding redundant sensing to the system. Data flow now becomes a major issue, since the bandwidth available between a processor and a sensor using a direct connection such as an A/D converter can be much higher than the bandwidth available between processors over the communication backbone. Although bandwidth limited by the communication backbone, the redundant system in FIG. 4 is still functional after multiple hardware and software failures, albeit at a reduced capacity. This is accomplished by having all processors run a dedicated software module that simply acquires data from the attached sensor and makes it available both to the local active module and to the communication backbone in blackboard form. 'Recessive' modules that may need sensor data will have to obtain it from the communications backbone at a lower update rate if they do not have direct access to the sensor on their processor. Note that although FIG. 4 shows 'Recessive' modules and their backup sensors associated with the same processor, this is not a requirement but is desirable if convenient in order to maximize available bandwidth for sensor updates. FIG. 5 shows an embodiment of the present invention as applied to an Unmanned Ground Combat Vehicle (UGCV).

The particular details, sizes, and equipment discussed above are cited merely to illustrate particular embodiments of the invention. It is contemplated that the use of the invention may involve elements having different characteristics. It is intended that the scope of the invention be defined by the claims appended hereto.

We claim:

1. A self-reconfiguring architecture for activating redundant modules for failed modules, comprising:
    a) a communication backbone;
    b) two or more processors, each processor connected to the communication backbone;
    c) two or more software modules, each software module residing on one processor as a primary module and residing on at least one other processor as a backup module, the primary and backup modules each having a functional state; and,
    d) a module status message residing on the communication backbone, the module status message comprising the functional state of the primary module, the module status message monitored by the backup module, the backup module being activated when the module status message indicates the functional state of the primary module is inactive.

2. The self-reconfiguring architecture of claim 1, further comprising sensing hardware, communicating sensor data and connecting with at least one of the processors.

3. The self-reconfiguring architecture of claim 2, wherein the sensing hardware comprises:
    a) a sensor, in communication with one processor; and
    b) a backup sensor, in communication with another processor, for redundant sensing.

4. The self-reconfiguring architecture of claim 1, wherein the two or more processors are distributed processors.

5. The self-reconfiguring architecture of claim 1, wherein the architecture is a mobile system.

6. The self-reconfiguring architecture of claim 5, wherein each processor is mobile.

7. The self-reconfiguring architecture of claim 5, wherein the mobile system comprises a robot.

8. A method for self-reconfiguring an architecture, the architecture comprising a module status message residing on a communication backbone, two or more processors connected to the backbone, and two or more software modules, wherein for each software module the method comprises:
   a) running the software module on one of the processors as a primary module;
   b) loading the software module as a backup module on at least one other processor;
   c) representing a functional state of the primary module in the module status message;
   d) monitoring the module status message, by the backup module; and,
   e) activating the backup module when the module status message indicates the functional state of the primary module is inactive.

9. The method for self-reconfiguring an architecture of claim 8, the architecture further comprising one or more primary sensors and one or more backup sensors, wherein for each software module the method further comprises:
   a) communicating sensed information from the primary sensor to the software module;
   b) wherein the software module accesses the backup sensor upon failure of the primary sensor.

10. The method for self-reconfiguring an architecture of claim 8, wherein the architecture reconfigures itself upon failure of a primary module.

11. The method for self-reconfiguring an architecture of claim 8, wherein the architecture reconfigures itself upon failure of a primary sensor.

12. The method for self-reconfiguring an architecture of claim 8, wherein the two or more processors are distributed processors.

13. The method for self-reconfiguring an architecture of claim 8, wherein the architecture is a mobile system.

14. The method for self-reconfiguring an architecture of claim 8, wherein each processor is mobile.

15. The method for self-reconfiguring an architecture of claim 8, wherein the architecture comprises a robot.

16. A distributed self-reconfiguring architecture for activating redundant modules in a distributed computing system, comprising:
   a) a communication backbone;
   b) two or more processors, each processor connected to the communication backbone;
   c) two or more software modules, each software module residing on one processor as a primary module and residing on at least one other processor as a backup module, the primary module and backup modules each having a functional state; and,
   d) a module status message residing on the communication backbone, the module status message comprising the functional state of the primary module, the module status message monitored by the backup module, the backup module being activated when the module status message indicates the functional state of the primary module is inactive.

17. The distributed self-reconfiguring architecture of claim 16, further comprising sensing hardware, connecting with at least one of the processors and communicating sensor data.

18. A mobile self-reconfiguring architecture for activating redundant modules in a mobile computing system, comprising:
   a) a communication backbone;
   b) two or more processors, each processor connected to the communication backbone;
   c) two or more software modules, each software module residing on one processor as a primary module and residing on at least one other processor as a backup module, the primary module and backup modules each having a functional state; and,
   d) a module status message residing on the communication backbone, the module status message comprising the functional state of the primary module, the module status message monitored by the backup module, the backup module being activated when the module status message indicates the functional state of the primary module is inactive.

19. The mobile self-reconfiguring architecture of claim 18, further comprising sensing hardware, connecting with at least one of the processors and communicating sensor data.

* * * * *